United States Patent [19]

Pack

[11] 4,177,062

[45] Dec. 4, 1979

[54] METHOD FOR REMOVING OIL FROM MILL SCALE AND RECOVERING METALLIC VALUES THEREIN

[75] Inventor: Paul R. Pack, Munster, Ind.

[73] Assignee: Harsco Corporation, Camp Hill, Pa.

[21] Appl. No.: 908,894

[22] Filed: May 23, 1978

[51] Int. Cl.$^2$ .............................................. C21B 3/04
[52] U.S. Cl. .......................................... 75/28; 75/24; 75/30
[58] Field of Search ................................. 75/24, 28, 30

[56] References Cited

U.S. PATENT DOCUMENTS 3,615,350 10/1971 Evers .......................................... 75/25
4,099,964 7/1978 Henery et al. ............................ 75/24

FOREIGN PATENT DOCUMENTS 1055932 1/1967 United Kingdom ........................ 75/24

*Primary Examiner*—M. J. Andrews
*Attorney, Agent, or Firm*—Dennis P. Clarke

[57] ABSTRACT

In a steelmaking method, the improvement comprising contacting oil-coated mill scale with hot slag derived from the steel-making process whereby the oil is ignited and flashed away and the scale commingled with the slag for subsequent processing, recovery of metallic values, and recycle to the steelmaking operation.

17 Claims, No Drawings

METHOD FOR REMOVING OIL FROM MILL SCALE AND RECOVERING METALLIC VALUES THEREIN

BACKGROUND OF THE INVENTION

This invention relates to the treatment of steel plant waste materials for recycling in the steelmaking operation.

In a typical steelmaking operation, an initial charge containing natural iron ore, sintered ore, or pelletized ore, or a mixture thereof, is smelted with fuel and flux in a reduction furnace, e.g., a blast furnace, and the smelted crude iron product is then subjected to one or more steelmaking and/or refining operations in a separate furnace or furnaces. In conventional steelmaking practice, the molten refining slag formed from impurities in the crude iron and added flux materials is separated from the refined steel, cooled, and processed for recycling to the smelting operation to recover metallic values contained therein. The resulting refined steel is normally subjected to steel rolling or forging operations.

A conventional rolling mill utilizes water emulsions of oil for lubrication and cooling purposes. Iron oxide scale is continually formed on the surface of the hot steel. This scale is repeatedly stripped away by the stresses of rolling. The scale falls, together with the emulsified oil, into collection pits beneath the rolling mill, whence the oil emulsion is recycled via sumps and filters. The scale accumulates and is periodically removed. This oil coated oxide scale is generally referred to in the art as "mill scale" or "roll scale".

The "mill scale" is a rich source of recyclable iron values, normally assaying from 65 to 75 percent iron, mainly as ferrosoferric oxide, $Fe_3O_4$.

To recover the iron values, the scale must be re-smelted in a blast furnace or other reduction furnace. Mill scale, however, is usually too finely divided to enter the blast furnace without prior agglomeration. The conventional method for agglomerating mill scale to blast furnace charge size is to subject the scale to agglomeration by sintering. Thus, a bed of mill scale and other agglomerable iron oxide fines, together with fluxes, e.g. limestone and fuel, e.g. coke breeze, is placed on a moving grate which is subjected to suction draft from below and ignited by an ignition flame from the top. The sintering process flame consists of an intense but narrow flame front, sustained by the carbon and other combustibles in the mix, which passes downward from the ignited top progressively to the bottom of the bed as the grate passes slowly over successive wind boxes which sustain the suction draft. As the high-temperature process flame front passes downward through the bed, the moisture in the mix is flashed off, the carbonate fluxes are calcined, the carbon is consumed, and iron oxides and calcined fluxes fuse together in a cake which is subsequently broken up, cooled, screened to eliminate (and recycle) fines, and sent as a significant charge to the blast furnace for re-smelting.

The suction draft system draws considerable fines and dust out of the bed during the sintering operation such that the sinter grate exhaust is initially dirty. The said exhaust must be continually cleaned to avoid dust emissions, to minimize wear on the blades of the draft fans, and to recapture the dust for return to the sintering process. To clean the raw exhaust gas, multicyclones, venturi scrubbers, electostatic precipitators, and/or fabric filters, used singly or in combination, are interposed between the wind boxes and the drafting fan blades.

When oil-coated mill scale is introduced into this feed mixture of a sintering plant, however, the oil gives rise to substantial problems. The oil tends to vaporize well below its ignition temperature. It is thus driven out as a vapor with the moisture ahead of the advancing sinter process flame front in an unburned condition. The oil vapor tends to foul electrostatic precipitators and fabric filters, and may accumulate in part as a fire and explosion hazard. In addition, a substantial portion thereof often passes through the dust collection system and escapes through the exhaust stack as a condensed vapor commonly called "blue smoke". Although it is possible to engineer a venturi scrubber powerful enough to remove the oil mist, such systems are costly to install and operate. At the present time, it is considered more efficient to de-oil the mill scale before it is introduced into a sinter plant.

Several methods have previously been suggested for the removal of oil from mill scale. These include detergent washing, solvent extraction, or incineration of the oil in a fired or self-firing system. As an example of the latter, oil-coated scale has been passed through an inclined rotary kiln which is heated to drive off the oil as vapor through a special stack equipped with afterburners. Such approaches, however, suffer from the cost of initial capital installations which must be manned and maintained. In addition, such systems often do not result in complete ignition of the oil, thereby giving rise to substantial pollution of the environment.

It is an object of the present invention to provide a process for removing oil from mill scale in an economic, efficient and environmentally sound manner, and for recovering the metallic values contained in said de-oiled scale.

SUMMARY OF THE INVENTION

In conventional steelmaking practice, the molten slag formed from the impurities in the steel (and added flux materials) is separated from the steel and carried in slag pots away from the steelmaking furnaces to a sloped and graded outdoor "slag pit area" where the slag, which is still liquid at from 2600° to over 3000° F., is poured out to form a thin layer on the pit floor. After successive pour-outs have substantially filled the pit, the solidified slag is cooled with water sprays, dug with mechanical loaders and carried to a processing plant for recovery of the recyclable metallics, including magnetic oxides of iron. The processing plant is generally equipped with screens, magnetic separators, bins, chutes and conveyors arranged to magnetically retrieve iron-rich portions of the feed, including scrap, spillage and droplet metal. The retrieved material is sorted by screens into (I) pieces large enough to re-enter the steelmaking process as directly charged scrap, (II) pieces of an intermediate size for direct feed to the blast furnace to be re-smelted, and (III) fines suited as sinter plant feed for agglomeration and re-smelting according to the above-described method.

The present invention comprises contacting the oil-coated oxide scale (i.e., mill scale) with the hot slag separated from the steelmaking operation at a temperature above the ignition temperature of the oil whereby the oil is ignited and substantially completely flashed away and further whereby the said de-oiled oxide scale reports to the slag for processing and ultimate sintering and re-smelting to recover metallic values contained therein.

DETAILED DESCRIPTION OF THE INVENTION

The steel rolling operation is commonly lubricated with an emulsifiable oil in aqueous emulsion form. The oils commonly used include palm oil, mineral oils, or mixtures thereof. As the oxide scale is stripped off the hot steel during the rolling operation, the emulsified oil adheres to the scale. As the water drains or evaporates, the scale is left coated with typically from about 2 to about 10% oil, by weight.

All of the oils generally employed as lubricants in the rolling operation may be rapidly and completely ignited and flashed away when contacted with the hot slag derived from the steelmaking operation.

According to the present invention, the oily mill scale is placed in successive layers in an active slag pit. After a layer of scale is placed fresh molten slag is poured directly on top of the scale layer. Two or more pourings of slag may be required to treat the entire layer of scale, and a new layer of scale may be placed only after the preceding layer has been completely covered by slag. The slag is well above the ignition temperature of conventional rolling mill oils and is sufficiently massive and radiant to immediately ignite and flash away all of the oil in the mill scale in a single burst of flame. There is an excess of combustion air due to the fact that the slag pit is outdoors and further in view of the fact that the hot slag mass sets up convective wind currents thereby insuring rapid and essentially smokeless combustion of the rolling oil.

The initial layer of scale may be placed in an empty slag pit prior to its first receipt of slag pour-out. In placing the scale, care is taken to cover only pit area that will be covered with hot slag, and to avoid areas where the flashing of the oil could injure personnel or damage equipment. In general, no scale is placed immediately under the slag pour point. As an alternative practice, scale can be cast pneumatically or mechanically onto the white-hot slag during or immediately after each pour-out of slag.

The de-oiled oxide scale reports directly to the cooled slag and is substantially recovered as fines suitable as a sinter plant feed for agglomeration and re-smelting in the slag processing operation.

EXAMPLE

A newly emptied, freshly graded dry slag pit, nominally 120 ft. by 45 ft. in size, was charged with oily mill scale to a nominal depth of 4–6 inches, in a restricted area beginning about 10–15 feet outward from the point of slag pour-out, and continuing outward to cover about 85 percent of the pit area. The oil content of the scale was approximately 4–6 percent. Subsequently, approximately 900 cubic feet of fresh, hot, molten, steel refining slag was poured off into the pit from a slag pot mounted on a specialized slag pot carrier vehicle. Upon contact with the slag, the oil in the scale flashed off in a ball of fire. After 3 such pourings of molten slag, the initial layer of scale was entirely reacted and entirely covered by solidified hot slag.

A second layer of oily mill scale was placed upon the slag bed, to a thickness of nominally 4–6 inches, by pushing the scale forward from the base of a pit with the blade of a rubber-tired loader. The tires were protected from the hot slag by the new layer of scale. Two additional pours of molten slag, of nominally 900 cubic feet each, were required to completely react with, de-oil, and cover this second layer of scale. In a similar manner, three additional layers of scale were placed, poured upon, reacted, and finally covered by steel refining slag. The pit was then cooled, dug with loaders, tempered with water to prevent dusting, and finally processed through a magnetic separation system. The total weight of scale processed and recovered through a period of 10 hours was approximately 400 tons, and the oil content of the reacted and processed scale was approximately 0.1 percent by weight.

What is claimed is:

1. In a steelmaking method wherein an initial ore charge is smelted to crude iron in a reduction furnace, the smelted product is refined into steel in a steelmaking operation, the resulting steel is rolled in the presence of rolling mill oil to produce rolled steel and an oil coated oxide scale is stripped from said rolled steel; including the steps of separating the hot slag produced in said steelmaking operation from said steel and processing and recycling said slag for recovery of metallic values contained therein, the improvement comprising contacting said stripped oil coated oxide scale with said separated hot slag at a temperature above the ignition temperature of the oil whereby the oil is ignited and substantially completely flashed away, the said de-oiled oxide scale reporting to said slag for processing and recycling to recover metallic values contained therein.

2. The method of claim 1 wherein said ore charge is smelted in a blast furnace.

3. The method of claim 2 wherein said initial charge comprises iron ore, including sinter and pellets.

4. The method of claim 2 wherein said initial charge includes scrap iron or steel.

5. The method of claim 2 wherein said rolling mill oil comprises an aqueous emulsion of oil.

6. The method of claim 5 wherein said oil comprises palm oil, mineral oil or a mixture thereof.

7. The method of claim 2 where said oxide scale contains up to about 75%, by weight, of iron as principally $Fe_3O_4$.

8. The method of claim 2 wherein said separated hot slag is conveyed molten to an outdoor slag pit following separation from said steel.

9. The method of claim 8 wherein one or more charges of said separated molten slag is cast directly onto the surface of said stripped oil coated oxide scale previously placed in said slag pit, whereby the said oil is substantially smokelessly ignited and flashed away as a result of the presence of a large volume of combustion air produced by the convection air currents generated by said hot slag.

10. The method of claim 8 wherein said stripped oil coated oxide scale is cast directly on the surface of the separated hot slag in said outdoor slag pit, whereby the said oil is substantially smokelessly ignited and flashed away as a result of the presence of a large volume of combustion air produced by the convection air currents generated by said hot slag.

11. The method of claim 2 wherein, prior to recycle, said hot slag interspersed with de-oiled oxide scale is cooled, size-classified and subjected to magnetic separation.

12. The method of claim 11 wherein large sized pieces of magnetically recovered material are recycled as part of the charge to the steel refining furnace.

13. The method of claim 11 wherein fines of magnetically recovered material and iron-bearing slag are recycled as direct feed to said blast furnace.

14. The method of claim 11 wherein fines of magnetically recovered material and iron-bearing slag are agglomerated prior to recycling as direct feed to said blast furnace.

15. The method of claim 14 wherein said fines are agglomerated by sintering.

16. The method of claim 2 wherein said stripped oil coated oxide scale is contacted with said hot slag at a temperature above about 2600° F.

17. The method of claim 2 wherein said stripped oxide scale contains from about 2% to about 10%, by weight, of oil.

* * * * *